United States Patent Office 2,773,043
Patented Dec. 4, 1956

2,773,043

RESINOUS COMPOSITIONS COMPRISING THERMOSETTING EPOXIDE RESINS AND THERMOPLASTIC POLYVINYL RESINS AND BENTONITE-AMINE REACTION PRODUCTS

Florian J. Zukas, Forest Hills, Pa., assignor to Westinghouse Electric Corporation, East Pittsburgh, Pa., a corporation of Pennsylvania No Drawing. Application September 28, 1954,
Serial No. 458,989

8 Claims. (Cl. 260—3.3)

The present invention relates to hardenable, normally liquid resinous compositions comprising thermosettable resinous polymeric epoxides in combination with thermoplastic polyvinyl resins, which liquid compositions are adapted to be cured to a homogeneous solid having excellent flexibility characteristics and impact resistance.

Heretofore, resinous polymeric epoxides have been used as insulation on electrical apparatus of various kinds. The normally liquid epoxide materials, when converted to a solid state by heating the same in the presence of a catalyst, have been found to be valuable insulating materials since they have a high dielectric strength, high thermal stability, and undergo little, if any, decomposition even during the high temperatures frequently encountered in the service of such apparatus. Such materials, however, when converted to a solid state have relatively low flexibility characteristics and impact resistance and their usefulness in certain electrical insulation applications, therefore, is limited.

It has been discovered that a solid resin having improved flexibility characteristics and impact resistance is obtained if measured amounts of certain thermoplastic polyvinyl resins are admixed with the epoxides prior to converting the same to a solid state by heating in the presence of a catalyst.

One material, dicyandiamide, is a particularly well suited catalyst for this purpose because mixtures of this material with a thermosettable epoxide resin and a thermoplastic resin have a relatively long shelf life, that is, will remain liquid at room temperature for a relatively long period of time. The liquid mixture will not become solid until it is heated. Many other materials which it would be desirable to use, although they do not have as long a shelf-life as dicyandiamide, have not been widely used heretofore because they are insoluble in the epoxides. In those instances where the insoluble catalysts have been used, it has been necessary to mechanically admix the insoluble catalyst with the resins thoroughly to obtain a uniform dispersion of the material throughout the resin. Such dispersions are not stable, however, and a portion of the insoluble catalyst settles out readily so that on heating there frequently results a heterogeneous or incomplete cure to the extent that the upper portion of thick sections or castings may not be cured at all. Furthermore, in those instances where complete cures have been obtained, it has been determined that the composition frequently has shrunk in volume and pulled away from the walls of the apparatus to which it has been applied to such an extent that its usefulness as insulating material is materially reduced.

The object of the present invention is to provide hardenable, normally liquid resinous compositions comprising a thermosettable resinous polymeric epoxide, a catalyst, and a stabilizing additive, in combination with thermoplastic resins adapted to be cured to a homogeneous solid having excellent flexibility characteristics and impact resistance.

Another object of the invention is to provide electrical apparatus provided with a hardenable, normally liquid resinous composition comprising a thermosettable resinous polymeric epoxide, a catalyst, and a stabilizing additive in combination with thermoplastic resins which, upon curing to a solid state, has excellent flexibility characteristics and impact resistance.

A further object of the invention is to provide processes for preparing such hardenable compositions.

Other and further objects of the invention will, in part, be obvious and will, in part, appear hereinafter.

I have discovered that the foregoing objects are attained if, when converting fluid resinous composition comprising thermosettable resinous polymeric epoxides in combination with thermoplastic resins to a solid state by heating the same in the presence of an insoluble catalyst therefor, the conversion is carried out in the presence of a measured amount of a bentonite-amine reaction product as a stabilizing additive.

Broadly, in accordance with the present invention, there are provided hardenable, normally liquid resinous compositions comprising a thermosetting resin comprising a resinous polymeric epoxide and catalytic amounts of an insoluble catalyst therefor, a thermoplastic resin comprising a plastisol including a resin and a plasticizer therefor, and a bentonite-amine reaction product in an amount sufficient to maintain the catalyst in stable suspension in the resins whereby the composition may be converted to a homogeneous solid having excellent flexibility characteristics and impact resistance.

The bentonite-amine reaction product serves to maintain the insoluble catalytic materials in suspension in the mixture of liquid resin. No appreciable quantity of the catalyst will settle out as occurs when the bentonite-amine reaction product is not used. Rather, in the present invention, the catalyst remains uniformly suspended throughout the liquid or pasty resin mixtures whereby even thick sections undergo a complete cure to a solid state, without undergoing substantially any volume shrinkage, to provide a product having excellent flexibility characteristics and impact resistance.

The bentonite-amine base reaction products employed in this invention are composed of a montmorillonite mineral in which at least a part of the cation content of the mineral has been replaced by a cation of an organic base. Clays that contain as a primary constituent a mineral of the group known as montmorillonites are generally referred to as betonites. Bentonites in their raw state are hydrophilic but upon reacting with organic bases or their salts become organophilic products.

More specifically, a bentonite clay of the character described and exhibiting substantial base-exchange capacity is reacted with an organic compound, more particularly one generally known as an onium compound, by substituting for the clay cation the cation of the organic compound. The reaction product may be prepared not only from a base-salt reacted with a clay-salt, but from a free base reacted with an acid clay.

Examples of organic base compounds and their salts usable in the practice of the invention are salts of aliphatic, cyclic aromatic, and heterocyclic amines; primary, secondary, tertiary amines, and polyamines; quaternary ammonium compounds, as well as other monovalent or polyvalent onium compounds.

In practicing this invention, aliphatic amine salts having from 12 to 20 carbon atoms, for example, hexadecyl amine salts and octadecyl amine salts, yield excellent results. The ratio of the amine compound to bentonite may be varied within certain limits in converting the bentonite to the organophilic condition. In general, however, it is desirable to react the amine salt with the bentonite in the approximate ratio of 100 milliequivalents of amine salt to 100 grams of bentonite. Reaction products produced within this ratio give the maximum swelling as tested in nitrobenzene.

It is to be understood that when reference is made to basic organic onium compounds such as amines, it is implied that before reacting with the clay by base-exchange the amine is converted to the onium form either by the addition of acid or by reason of the fact that some part of the inorganic base in the naturally occurring clay consists of hydrogen.

An example of the preparation of a suitable bentonite-amine reaction product, hereinafter referred to as "D," is as follows:

One thousand grams of a Wyoming bentonite is dispersed in 25.45 liters of water, and the slurry formed is allowed to stand for two hours to settle out the non-clay impurities. In a separate vessel, 54.37 grams of glacial acetic acid is added to 240 grams of octadecyl amine, and the amine salt is then dissolved in 1.45 liters of warm water. Upon addition of the amine salt solution to the dispersed bentonite, flocculation occurs and the precipitate, after being filtered, washed, dried and pulverized, constitutes the bentonite-organic base reaction product.

Other examples of suitable onium compounds and processes indicating how a bentonite-organic base reaction product may be prepared are found in U. S. Patent No. 2,531,440 to Jordan issued November 28, 1950, and in U. S. Patent No. 2,531,427 to Hauser issued November 28, 1950. One or more of the bentonite-amine reaction products may be employed in the compositions of this invention. The bentonite-amine reaction product is used in minor amounts, for example, in a quantity amounting to from 0.1% to 15% by weight and preferably in an amount within the range of from 0.5% to 5% by weight for each 100 parts of epoxide resin employed.

The resinous polymeric epoxides, also known as glycidyl polyethers, employed in accordance with the present invention may be prepared by reacting predetermined amounts of at least one polyhydric phenol and at least one epihalohydrin in an alkaline medium. Phenols which are suitable for use in preparing such resinous polymeric epoxides include those which contain at least two phenolic hydroxy groups per molecule. Polynuclear phenols which have been found to be particularly suitable include those wherein the phenol nuclei are joined by carbon bridges, such for example as 4,4'-dihydroxy-diphenyl-dimethyl-methane (referred to hereinafter as bis-phenol "A"), 4,4'-dihydroxy-diphenyl-methyl-methane and 4,4'-dihydroxy-diphenyl-methane. In admixture with the named polynuclear phenols, use also may be made of those polynuclear phenols wherein the phenol nuclei are joined by sulfur bridges, such for example as 4,4'-dihydroxy-diphenyl-sulfone.

While it is preferred to use epichlorohydrin as the epihalohydrin in the preparation of the resinous polymeric epoxide starting materials of the present invention, homologues thereof, for example, epibromohydrin and the like also may be used advantageously.

In the preparation of the resinous polymeric epoxides, aqueous alkali is employed to combine with the halogen of the epihalohydrin reactant. The amount of alkali employed should be substantially equivalent to the amount of halogen present and preferably should be employed in an amount somewhat in excess thereof. Aqueous mixtures of alkali metal hydroxides, such as potassium hydroxide and lithium hydroxide, may be employed although it is preferred to use sodium hydroxide since it is relatively inexpensive.

The resinous polymeric epoxide, or glycidyl polyether of a dihydric phenol, suitable for use in this invention has a 1,2-epoxy equivalency greater than 1.0. By epoxy equivalency reference is made to the average number of 1,2-epoxy groups

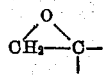

contained in the average molecule of the glycidyl ether. Owing to the method of preparation of the glycidyl polyethers and the fact that they are ordinarily a mixture of chemical compounds having somewhat different molecular weights and contain some compounds wherein the terminal glycidyl radicals are in hydrated form, the epoxy equivalency of the product is not necessarily the integer 2.0. However, in all cases it is a value greater than 1.0. The 1,2-epoxy equivalency of the polyethers is thus a value between 1.0 and 2.0.

Resinous polymeric expoxides or glycidyl polyethers suitable for use in accordance with this invention may be prepared by admixing and reacting from one to two mol proportions of epihalohydrin, preferably epichlorohydrin, with about one mol proportion of bis-phenol "A" in the presence of at least a stoichiometric excess of alkali based on the amount of halogen.

To prepare the resinous polymeric epoxides, aqueous alkali, bis-phenol "A" and epichlorohydrin are introduced into and admixed in a reaction vessel. The aqueous alkali serves to dissolve the bis-phenol "A" with the formation of the alkali salts thereof. If desired, the aqueous alkali and bis-phenol "A" may be admixed initially and then the epichlorohydrin added thereto, or an aqueous solution of the alkali and bis-phenol "A" may be added to the epichlorohydrin. In any case, the mixture is heated in the vessel to a temperature within the range of about 80° C. to 110° C. for a period of time varying from about one-half hour to three hours, or more depending upon the quantities of reactants used.

Upon completion of heating, the reaction mixture separates into layers. The upper aqueous layer is withdrawn and discarded, and the lower layer is washed with hot water to remove unreacted alkali and halogen salt, in this case, sodium chloride. If desired, dilute acids, for example, acetic acid or hydrochloric acid, may be employed during the washing procedure to neutralize the excess alkali.

The thermoplastic resins employed in accordance with the present invention preferably comprise those materials known in the art as plastisols, which materials comprise finely divided non-volatile halogen-containing high molecular weight resins dispersed in a plasticizer. The resinous materials and plasticizer preferably are premixed prior to their admixture with the other ingredients comprising the compositions of this invention. However, when resinous materials are used which are of a dispersible grade, for example, comprising particles of an average diameter of from about 1 to 5 microns, those materials and the plasticizer may be introduced separately into the present compositions.

The non-volatile halogen-containing high molecular weight resins employed in accordance with the present invention may be selected from a relatively large group. Examples of suitable materials include vinyl halide and vinylidene halide resins such as polyvinyl chloride, polyvinylidene bromide, polyfluorochloroethylene; vinyl chloride and vinylidene chloride copolymers; copolymers of vinyl halides and vinylidene halides with other unsaturates such as vinyl chloride with vinyl acetate, vinylidene bromide with vinyl acetate, and ethylene with vinyl chloroacetate; halogenated high molecular weight natural resins and hydrocarbons such as the commercially available halogenated paraffin waxes, the halogenated natural rubbers, and the like.

Examples of plasticizers which are suitable for use in accordance with this invention include di-iso-octyl phthalate, dicapryl phthalate, di-n-octyl phthalate, butyl benzyl phthalate, di-2-ethylhexyl phthalate, dibutyl phthalate, dioctyl azelate, dioctyl adipate, dioctyl sebacate, dibenzyl sebacate, tricresyl phosphate, tri-iso-octyl phosphate, octyl diphenyl phosphate, tri-2-ethylhexyl phosphate, propylene glycol diacetyl ricinoleate, methyl acetyl ricinoleate, tetrahydrofurfuryl oleate and tetraethylene glycol di-isohexoate. The plasticizers may be used singly or in any suitable admixture of two or more.

The plastisols, comprising the suspension of the resinous materials in the plasticizers, are employed in amounts within the range of 20% to 80% by weight based on the total weight of the composition. The best dispersion of the resinous materials in the plasticizers is obtained by passing the materials through a three-roll paint mill, or like mixing device, for 3 or 4 passes. The plasticizer is employed in an amount within the range of 40 parts to 250 parts by weight for each 100 parts by weight of the resin.

While catalysts which are soluble in the resinous polymeric epoxides may be used, this invention is particularly adapted to the use of catalytic materials which are insoluble or only slightly soluble in the epoxides at temperatures from 25° C. to 30° C. Examples of catalysts which satisfy these requirements and which may be used in accordance with the preferred practice of this invention are dicyandiamide; triethanolamine borate; m-phenylenediamine; diphenylamine; melamine; quinoline; urea and substituted ureas such as the alkyl ureas having from 1 to 5 carbon atoms in each alkyl radical of which there may be from 1 to 4 attached to the nitrogen atoms, for instance, tetraethyl urea; guanidine and substituted guanidines such as the alkyl guanidines having from 1 to 5 carbon atoms in each alkyl radical of which there may be from 1 to 4 attached to the nitrogen atoms of the amine groups such as symmetrical dibutyl guanidine; and acids such as maleic acid, fumaric acid, citraconic acid, phthalic acid, and anhydrides thereof, if any. The catalysts may be used singly or in any proper admixture of two or more and in a quantity of from 6% to 50% by weight based on 100 parts by weight of the resinous polymeric epoxide.

Finely divided fillers may be employed in the compositions of the present invention. Examples of suitable filler materials include calcium carbonate, iron oxide, titanium dioxide, kaolin, wood flour, silica flour, finely divided mica, asbestos fibers, chopped glass fibers and alumina. The inert finely divided fillers may be employed in a relatively large proportion, for example, in amounts up to 300 parts by weight for each 100 parts by weight of the mixture of liquid resins.

The order in which the various ingredients are admixed in formulating the hardenable, normally liquid resinous compositions of the present invention is not critical. One convenient method for formulating the compositions comprises admixing the bentonite-amine reaction product and catalytic material with about 20% by weight of the resinous polymeric epoxide and passing the mixture through a three-roll paint mill until the mixture is of a smooth consistency. About three to four passes through the paint mill generally provides a homogeneous product having a satisfactory consistency. The remainder of the ingredients then are added to the homogeneous mixture and the resultant mass is stirred in a vessel provided with a paddle mixer until a completely homogeneous liquid to pasty product is obtained. The product will cure completely at a temperature of about 125° C. to 175° C. in about to three hours to a solid state without undergoing substantially any volume shrinkage. When cooled, the homogeneous solid product is found to have excellent flexibility characteristics and impact resistance. Furthermore, the adhesion qualities of the product to metals and its resistance to attack by chemicals and moisture are excellent.

In order to indicate even more fully the nature of the hardenable, filling compositions of the present invention, the following examples of suitable formulations are set forth. The parts given are by weight unless otherwise indicated.

EXAMPLE I

Part A

About 54 parts of sodium hydroxide are dissolved in about 600 parts of water in an open kettle provided with a mechanical stirrer. About 3 mols of bis-phenol "A" are added and the resultant mixture is stirred for about 10 minutes at a temperature of about 30° C. Thereafter, approximately 4 mols of epichlorohydrin are added, whereupon the temperature of the resultant mixture increases to about 50° C. to 70° C. due to the heat of reaction. About 42 parts of caustic soda dissolved in about 9 parts of water are then added with continuous stirring and the mixture is maintained at a temperature of about 90° C. to 100° C. for a period of about one hour. The mixture then is permitted to separate into two layers. The upper layer is withdrawn and discarded and the lower layer is washed with boiling water to which may be added acetic acid in an amount sufficient to neutralize unreacted caustic soda. A liquid resinous polymeric epoxide is obtained after substantially all of the wash water has been removed.

Part B

A hardenable, filling composition is prepared by admixing 15 parts of the bentonite-amine reaction product D, prepared from a Wyoming bentonite as indicated above, and 50 parts of dicyandiamide with about 100 parts of the resinous polymeric epoxide prepared in Part A of this example. The mixture is passed through a three-roll paint mill until a homogeneous product of smooth consistency is obtained. Thereafter, 400 additional parts of the resinous polymeric epoxide prepared in Part A of this example, 425 parts of polyvinyl chlorode, 390 parts of di-2-ethylhexyl phthalate, and 750 parts of calcium carbonate are introduced into the mass and thoroughly admixed therewith to yield a homogeneous pasty composition. The composition may be stored for long periods of time at room temperature without separation of the components and without converting to a solid. It cures completely to a solid state upon heating at a temperature of 150° for two and a half hours. The cured solid has excellent flexibility characteristics and high impact resistance.

Examples of other suitable formulations include:

EXAMPLE II

| | Parts |
|---|---|
| Resinous polymeric epoxide | 450 |
| Polyvinyl chloride | 400 |
| Di-2-ethylhexyl phthalate | 425 |
| Phthalic anhydride | 45 |
| Bentonite-amine reaction product "D" | 15 |

EXAMPLE III

| | Parts |
|---|---|
| Resinous polymeric epoxide | 500 |
| Polyvinylidene bromide | 400 |
| Dibutyl phthalate | 425 |
| Triethanolamine borate | 50 |
| Bentonite-amine reaction product "D" | 15 |
| Kaolin | 450 |
| Calcium carbonate | 300 |

The hardenable, filling compositions of the present invention have properties and characteristics which render them suitable for many uses. Thus, the compositions cure completely to a uniform solid state without undergoing substantial volume shrinkage, they have excellent impact resistance and high flexibility, they are resistant to attack by chemicals and moisture penetration, and they are extremely adherent to metals. These properties and characteristics make the compositions of this invention particularly well suited for use as filling compositions for potting and casting applications such as in casting small transformers and in casting leads. The compositions also are useful as oil seals and as insulation for motor windings.

While the present invention has been described with

I claim as my invention:

1. A hardenable, normally liquid resinous composition comprising from 20 to 80 parts by weight of a thermosetting resin comprising a glycidyl polyether of a polyhydric phenol having a 1,2-epoxy equivalency of between 1 and 2 and which is devoid of other reactive substituents than phenolic hydroxyl groups, and an insoluble catalyst therefor, the catalyst being present in an amount of from 6% to 50% by weight based on 100 parts by weight of the glycidyl polyether, from 80 to 20 parts by weight of a thermoplastic resin comprising a plastisol including a resin selected from the group consisting of non-volatile halogen-containing high molecular weight vinylidene polymers, halogenated paraffin waxes, and halogenated natural rubber and a plasticizer therefor, and a bentonite-amine reaction product in an amount sufficient to maintain the catalyst in suspension in the liquid resins whereby the composition may be converted to a homogeneous solid having excellent flexibility characteristics and impact resistance.

2. A hardenable, normally liquid resinous composition as set forth in claim 1 wherein the thermoplastic resin comprises from 25% to 80% by weight of plasticizer for each 100 parts by weight of resin.

3. The composition of claim 1, admixed with up to 300 parts by weight of finely divided filler.

4. In the process of converting a liquid composition comprising (A) from 20 to 80 parts by weight of a thermosetting resin comprising a glycidyl polyether of a polyhydric phenol having a 1,2-epoxy equivalency of between 1 and 2 and which is devoid of other reactive substituents than phenolic hydroxyl groups, and an insoluble catalyst therefore, the catalyst being present in an amount of from 6% to 50% by weight based on 100 parts by weight of the glycidyl polyether, and (B) from 80 to 20 parts by weight of a thermoplastic resin comprising a plastisol including a resin selected from the group consisting of non-volatile halogen-containing high molecular weight vinylidene polymers, halogenated paraffin waxes, and halogenated natural rubber and a plasticizer therefor to a solid by heating the same, the improvement which comprises carrying out the conversion in the presence of a bentonite-amine reaction product is an amount sufficient to maintain the catalyst in suspension in the liquid resins whereby the composition is converted to a homogeneous solid having excellent flexibility characteristics and impact resistance.

5. The process of claim 4 wherein the thermoplastic resin comprises from 25% to 80% by weight of plasticizer for each 100 parts by weight of resin.

6. An article of manufacture comprising a casing having disposed therein a flexible, hard cured resinous composition comprising from 20 to 80 parts by weight of a thermoset resin comprising a glycidyl polyether of a polyhydric phenol having a 1,2-epoxy equivalency of between 1 and 2 and which is devoid of other reactive substituents than phenolic hydroxyl groups, from 80 to 20 parts by weight of a thermoplastic resin comprising a plastisol including a resin selected from the group consisting of non-volatile halogen-containing high molecular weight vinylidene polymers, halogenated paraffin waxes, and halogenated natural rubber and a plasticizer therefor, and a bentonite-amine reaction product, the bentonite-amine reaction product being present in an amount of from 0.5% to 5% by weight for each 100 parts of glycidyl polyether.

7. The process which comprises applying to a casing a hardenable, normally liquid resinous composition comprising from 20 to 80 parts by weight of a thermosetting resin comprising a glycidyl polyether of a polyhydric phenol having a 1,2-epoxy equivalency of between 1 and 2 and which is devoid of other reactive substituents than phenolic hydroxyl groups, and an insoluble catalyst therefor, the catalyst being present in an amount of from 6% to 50% by weight based on 100 parts by weight of the glycidyl polyether, from 80 to 20 parts by weight of a thermoplastic resin comprising a plastisol including a resin selected from the group consisting of non-volatile halogen-containing high molecular weight vinylidene polymers, halogenated paraffin waxes, and halogenated natural rubber and a plasticizer therefor, and a bentonite-amine reaction product in an amount sufficient to maintain the catalyst in suspension in the liquid resins, and heating the composition to convert the same to a homogeneous solid having excellent flexibility characteristics and impact resistance.

8. A hardenable, normally liquid resinous composition comprising from 20 to 80 parts by weight of a thermosetting resin comprising a glycidyl polyether of a polyhydric phenol having a 1,2-epoxy equivalency of between 1 and 2 which is devoid of other reactive substituents than phenolic hydroxyl groups, and a catalyst therefor, the catalyst being present in an amount of from 6% to 50% by weight based on 100 parts by weight of the glycidyl polyether, from 80 to 20 parts by weight of a thermoplastic resin comprising a plastisol including a resin selected from the group consisting of non-volatile halogen-containing high molecular weight vinylidene polymers, halogenated paraffin waxes, and halogenated natural rubber and a plasticizer therefor, a bentonite amine reaction product in an amount of from 0.5% to 5% by weight for each 100 parts of said glycidyl polyether, and up to 300 parts by weight of finely divided filler.

References Cited in the file of this patent

UNITED STATES PATENTS

| | | |
|---|---|---|
| 2,500,600 | Bradley | Mar. 14, 1950 |
| 2,531,396 | Carter | Nov. 28, 1950 |